United States Patent
Chrysos et al.

(10) Patent No.: US 9,998,377 B2
(45) Date of Patent: *Jun. 12, 2018

(54) ADAPTIVE SETTING OF THE QUANTIZED CONGESTION NOTIFICATION EQUILIBRIUM SETPOINT IN CONVERGED ENHANCED ETHERNET NETWORKS

(71) Applicant: International Business Machines Corporation, Armonk, NY (US)

(72) Inventors: Nikolaos Chrysos, Thalwil (CH); Daniel Crisan, Adliswil (CH); Casimer M. DeCusatis, Poughkeepsie, NY (US); Mircea Gusat, Langnau (CH); Cyriel J. Minkenberg, Gutenswil (CH); Fredy D. Neeser, Langnau am Albis (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/502,084

(22) Filed: Sep. 30, 2014

(65) Prior Publication Data

US 2015/0019752 A1 Jan. 15, 2015

Related U.S. Application Data

(63) Continuation of application No. 13/834,600, filed on Mar. 15, 2013.

(51) Int. Cl.
  *G06F 15/16* (2006.01)
  *H04L 12/803* (2013.01)
  *H04L 12/801* (2013.01)

(52) U.S. Cl.
  CPC ............ *H04L 47/122* (2013.01); *H04L 47/12* (2013.01)

(58) Field of Classification Search
  CPC ..... H04W 24/08; H04W 40/12; H04W 48/12; H04W 28/02; H04W 28/0289;
  (Continued)

(56) References Cited

U.S. PATENT DOCUMENTS 5,751,969 A 5/1998 Kapoor
6,901,053 B1 5/2005 Davies
(Continued)

FOREIGN PATENT DOCUMENTS

CN 102025617 A 4/2011
JP 2011146982 A 7/2011
WO 2011065268 A1 3/2011

OTHER PUBLICATIONS

U.S. Appl. No. 13/834,455; Final Office Action, filed Mar. 15, 2013; dated Jun. 25, 2015; 24 pages.
(Continued)

*Primary Examiner* — Oscar Louie
*Assistant Examiner* — Da T Ton
(74) *Attorney, Agent, or Firm* — Cantor Colburn LLP; Margaret A. McNamara

(57) ABSTRACT

Embodiments relate to controlling workload flow on converged Ethernet links. An aspect includes coupling, by a processing device, a first control loop to a second control loop. The second control loop monitors the operation of the first control loop. An equilibrium set point is initialized for the second control loop prior to commencing operation of the first control loop. Accordingly, the equilibrium set point value is adjusted in the second control loop continuously based on a rate of operation of the first control loop.

12 Claims, 4 Drawing Sheets

(58) Field of Classification Search
CPC .. H04W 28/046; H04W 52/267; H04L 41/12; H04L 41/0609; H04L 41/0806; H04L 41/5003; H04L 1/0002; H04L 48/90
USPC ......... 709/223–226, 230–235; 370/224–229, 370/252–254
See application file for complete search history.

(56) References Cited

U.S. PATENT DOCUMENTS

| | | | |
|---|---|---|---|
| 7,706,353 | B2 | 4/2010 | Roy |
| 7,756,959 | B1 | 7/2010 | Beshai et al. |
| 7,782,793 | B2 | 8/2010 | Olesinski et al. |
| 7,787,367 | B2 | 8/2010 | Gusat et al. |
| 7,830,793 | B2 | 11/2010 | Gai et al. |
| 7,873,441 | B2 | 1/2011 | Synesiou et al. |
| 7,957,293 | B2 | 6/2011 | Mayhew |
| 8,054,744 | B1 | 11/2011 | Bishara et al. |
| 8,059,532 | B2 | 11/2011 | Riddle et al. |
| 8,089,884 | B2 | 1/2012 | Liu |
| 8,174,978 | B2 | 5/2012 | Naven et al. |
| 8,189,479 | B1 | 5/2012 | Doherty et al. |
| 8,260,956 | B2 | 9/2012 | Reyhner et al. |
| 2001/0055313 | A1* | 12/2001 | Yin ..................... H04L 12/5602 370/466 |
| 2002/0095493 | A1 | 7/2002 | Byrnes |
| 2005/0091303 | A1 | 4/2005 | Suzuki |
| 2006/0045008 | A1* | 3/2006 | Sun ..................... H04L 47/10 370/229 |
| 2006/0056308 | A1 | 3/2006 | Gusat et al. |
| 2008/0049746 | A1 | 2/2008 | Morrill et al. |
| 2008/0062879 | A1 | 3/2008 | Sivakumar et al. |
| 2008/0080504 | A1 | 4/2008 | Gusat et al. |
| 2008/0273465 | A1 | 11/2008 | Gusat et al. |
| 2008/0282058 | A1 | 11/2008 | Maher et al. |
| 2009/0135729 | A1 | 5/2009 | Saffre |
| 2009/0234908 | A1 | 9/2009 | Reyhner et al. |
| 2009/0238070 | A1 | 9/2009 | Rivers et al. |
| 2009/0279433 | A1 | 11/2009 | Briscoe et al. |
| 2009/0300209 | A1 | 12/2009 | Elzur |
| 2011/0035498 | A1 | 2/2011 | Shah et al. |
| 2011/0158091 | A1 | 6/2011 | Sun et al. |
| 2011/0164496 | A1 | 7/2011 | Loh et al. |
| 2011/0176423 | A1 | 7/2011 | Chowdhury et al. |
| 2011/0255402 | A1 | 10/2011 | Fourcand |
| 2011/0261722 | A1 | 10/2011 | Awano et al. |
| 2011/0261723 | A1 | 10/2011 | Yamato et al. |
| 2011/0261831 | A1 | 10/2011 | Sharma et al. |
| 2011/0267942 | A1* | 11/2011 | Aybay ................. H04L 41/0816 370/230 |
| 2011/0273983 | A1* | 11/2011 | Bergamasco ......... H04L 47/10 370/232 |
| 2011/0273988 | A1 | 11/2011 | Tourrilhes et al. |
| 2011/0285516 | A1 | 11/2011 | Ritter |
| 2011/0286324 | A1 | 11/2011 | Bellagamba et al. |
| 2011/0299389 | A1 | 12/2011 | Mau et al. |
| 2012/0020219 | A1 | 1/2012 | Kamiya et al. |
| 2012/0140626 | A1* | 6/2012 | Anand ................. H04L 49/1515 370/235 |
| 2012/0151472 | A1 | 6/2012 | Koch et al. |
| 2012/0155256 | A1 | 6/2012 | Pope et al. |
| 2012/0163178 | A1 | 6/2012 | Gordon et al. |
| 2013/0155850 | A1 | 6/2013 | Chrysos et al. |
| 2013/0155857 | A1 | 6/2013 | Chrysos et al. |
| 2013/0155858 | A1 | 6/2013 | Chen et al. |
| 2013/0294236 | A1 | 11/2013 | Beheshti-Zavareh et al. |
| 2014/0071814 | A1 | 3/2014 | Landscheidt et al. |
| 2014/0112128 | A1* | 4/2014 | Kwan ..................... H04L 47/26 370/230 |
| 2014/0161135 | A1 | 6/2014 | Acharya et al. |
| 2014/0229945 | A1 | 8/2014 | Barkai |
| 2014/0241345 | A1 | 8/2014 | DeCusatis et al. |
| 2014/0269274 | A1 | 9/2014 | Banavalikar et al. |

OTHER PUBLICATIONS

U.S. Appl. No. 13/834,503; Notice of Allowance, filed Mar. 15, 2013, dated Aug. 11, 2015, 19 pages.
U.S. Appl. No. 13/834,455; Notice of Allowance, filed Mar. 15, 2013; dated Sep. 17, 2015; 18 pages.
U.S. Appl. No. 14/501,491; Notice of Allowance; filed Sep. 30, 2014; dated Jul. 17, 2015; 18 pages.
U.S. Appl. No. 14/501,908; Notice of Allowance, filed Sep. 30, 2014; dated Aug. 12, 2015; 19 pages.
Briscoe et al., "Tunnelling of Explicit Congestion Notification (RFC6040)", Terminal Disclosure, Nov. 1, 2010, 71 pages.
Crisan et al., "Comparative Evaluation of CEE-based Switch Adaptive Routing", IBM, 2010, pp. 1-12.
Crisan et al., "Short and Fat: TCP Performance in CEE Datacenter Networks", Proceedings of 2011 IEEE 19th Annual Symposium on High Performance Interconnects (HOTI 2011) , pp. 43-50.
D. Papadimitriou, et al., "Open Research Issues in Internet Congestion Control", (RFC6077), IPCOM000203818D, IP.com Prior Art Database, Feb. 2011, pp. 1-103.
Dinu et al., "Inferring a Network Congestion Map with Zero Traffic Overhead", 2011 19th IEEE International Conference on Network Protocols (ICNP), pp. 69-78.
Gusat, et al., "R3C2: Reactive Route and Rate Control for CEE," 18th IEEE Symposium on High Performance Interconnects, 2010, pp. 1-8.
Hagen et al., "Performance Evaluation of DCB's Priority-Based Flow Control", Proceedings 2011, IEEE 10th International Symposium on Network Computing & Applications (NCA 2011), pp. 328-333.
Hayashi et al., "Improving Fairness of Quantized Congestion Notification for Data Center Ethernet Networks", Proceedings of 2011 31st International Conference on Distributed Computing Systems Workshops (ICDCS Workshops), pp. 20-25, 2011.
IBM Systems and Technology, "Software Defined Networking: A New Paradigm for Virtual Dynamic, Flexible Networking" Thought Leadership White Paper, IBM, Oct. 2012, pp. 1-8.
M. Suchara et al "Network Architecture for Joint Failure, Recovery and Traffic Engineering", SIGMETRICS'11, ACM, Jun. 2011, pp. 1-12.
McKeown et al, "OpenFlow: Enabling Innovation in Campus Networks" ACM SIGCOMM Computer Communication Review Archive, vol. 38, Issue 2, 2008, pp. 1-6.
Minkenberg et al., "Adaptive Routing for Convergence Enhanced Ethernet", HPSR'09 Proceedings of 15th International Conference on High Performance Switching & Routing, Nov. 3, 2009, 8 pages.
P. Devkota, et al "Performance of Quantized Congestion Notification in TCP Incast in Data Centers", 18th Annual IEEE/ACM International Symposium on Modeling, Analysis and Simulation of Computer and Telecommunication Systems, 2010, pp. 1-9.
Zhang et al "An Adaptive Congestion Control Strategy for Wireless Sensor Networks", 2011 International Conference on Information Technology, Computer Engineering and Management Services (ICM), 2, pp. 265-268.
Pfaff, et al. "OpenFlow Switch Specification," Version 1.1.0 Implemented (Wire Protocol 0x02), Feb. 28, 2011, pp. 1-56.
S. Lam, et al.,"An Experimental Study of the Congestion Control of Packet Communication Networks," IPCOM000152019D, IP.com Prior Art Database, Mar. 1980, pp. 1-55.
Tam et al., "Leveraging Performance of Multiroot Data Center Networks by Reactive Reroute," 2010 18th IEEE Symposium on High Performance Interconnects, IEEE Computer Society, 2010, pp. 66-74.
UK International Search Report and Written Opinion for International Application No. PCT/IB2014/059458; International Filing Date: Mar. 5, 2014; dated Jun. 10, 2014; 6 pages.
Welzl et al, "Congestion Control in the RFC Series (RFC5783)", Technical Disclosure, Feb. 1, 2010, 57 pages.
U.S. Appl. No. 13/834,679; Non-Final Office Action, filed Mar. 15, 2013; dated Mar. 19, 2015; 28 pages.
U.S. Appl. No. 13/834,455; Non-Final Office Action, filed Mar. 25, 2013; dated Dec. 11, 2014; 44 pages.

(56) References Cited

OTHER PUBLICATIONS

U.S. Appl. No. 13/834,503; Non-Final Office Action, filed Mar. 15, 2013; dated Apr. 27, 2015; 30 pages.
U.S. Appl. No. 14/501,491; Non-Final Office Action, filed Sep. 30, 2014; dated Mar. 3, 2015; 37 pages.
U.S. Appl. No. 14/501,908; Non-Final Office Action, filed Sep. 30, 2014; dated Apr. 28, 2015; 24 pages.
P. Devkota, et al.,"Performance of Quantized Congestion Notification in TCP Incast in Data Centers," A Thesis, Texas AandM University, May 2010, pp. 1-91.
U.S. Appl. No. 13/834,600; NonFinal Office Action, filed Mar. 15, 2013; dated Jan. 29, 2016; 43 pages.
U.S. Appl. No. 13/834,679; Non-Final Office Action, filed Mar. 15, 2013; dated Sep. 30, 2015; 13 pages.

\* cited by examiner

ADAPTIVE SETTING OF THE QUANTIZED CONGESTION NOTIFICATION EQUILIBRIUM SETPOINT IN CONVERGED ENHANCED ETHERNET NETWORKS

DOMESTIC PRIORITY

This application is a continuation of U.S. patent application Ser. No. 13/834,600, filed Mar. 15, 2013, the content of which is incorporated by reference herein in its entirety.

BACKGROUND

The present invention relates to network congestion, and more specifically, to adaptively determining the equilibrium set point for a quantized congestion notification (QCN) protocol to prevent instability or a race condition between a priority flow control (PFC) protocol and a QCN protocol on converged Ethernet links. The present invention may also apply to virtualized CEE-like Software Defined Networks (SDN).

IEEE 802.1 data center bridging (DCB) Ethernet is often used as a primary physical network protocol in datacenters for computer-to-computer communications. In contrast to the modern 802.1Qau DCB (i.e., convergence enhanced Ethernet (CEE)/data center Ethernet (DCE)), the traditional Ethernet was typically designed to be a best-effort network and may experience network congestion. Network congestion occurs when a link or node is carrying so much data that its quality of service deteriorates. Typical effects include queueing delay, packet loss and/or the blocking of new connections. A consequence of packet loss or the blocking of new connections is that incremental increases in offered load only lead to small increases in network throughput or to an actual reduction in network throughput. Moreover, network congestion may lead to a congestive collapse at a choke point in the network, where the total incoming traffic to a node exceeds the outgoing bandwidth. When a network is in such a condition, there are high levels of packet delay and loss and general quality of network service is poor. These effects are aggravated in the modern multitenant datacenters using server and network virtualization on top of Layer 2 CEE fabrics with Priority Flow Control (PFC, 802.1Qbb), used for converged lossless traffic. Hence the need for Quantized Congestion Notification (QCN, 802.1Qau), which is today built in most modern CEE switches and adapters, as well as being introduced in the new Virtual Overlays and software-defined networking (SDN) solutions.

SUMMARY

According to an embodiment of the present invention, a method for controlling workload flow on converged Ethernet links is provided. The method includes coupling, by a processing device, a first control loop to a second control loop. The second control loop monitors the operation of the first control loop. An equilibrium set point is initialized for the second control loop prior to commencing operation of the first control loop. Accordingly, the equilibrium set point value is adjusted in the second control loop continuously based on a rate of operation of the first control loop.

According to another embodiment of the present invention, a computer program product for controlling workload flow on converged Ethernet links is provided. The computer program product includes a storage medium having computer-readable program code embodied thereon, which when executed by a computer processor, causes the computer processor to implement a method. The method includes coupling a first control loop to a second control loop. The second control loop monitors the operation of the first control loop. An equilibrium set point is initialized for the second control loop prior to commencing operation of the first control loop. Accordingly, the equilibrium set point value is adjusted in the second control loop continuously based on a rate of operation of the first control loop.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
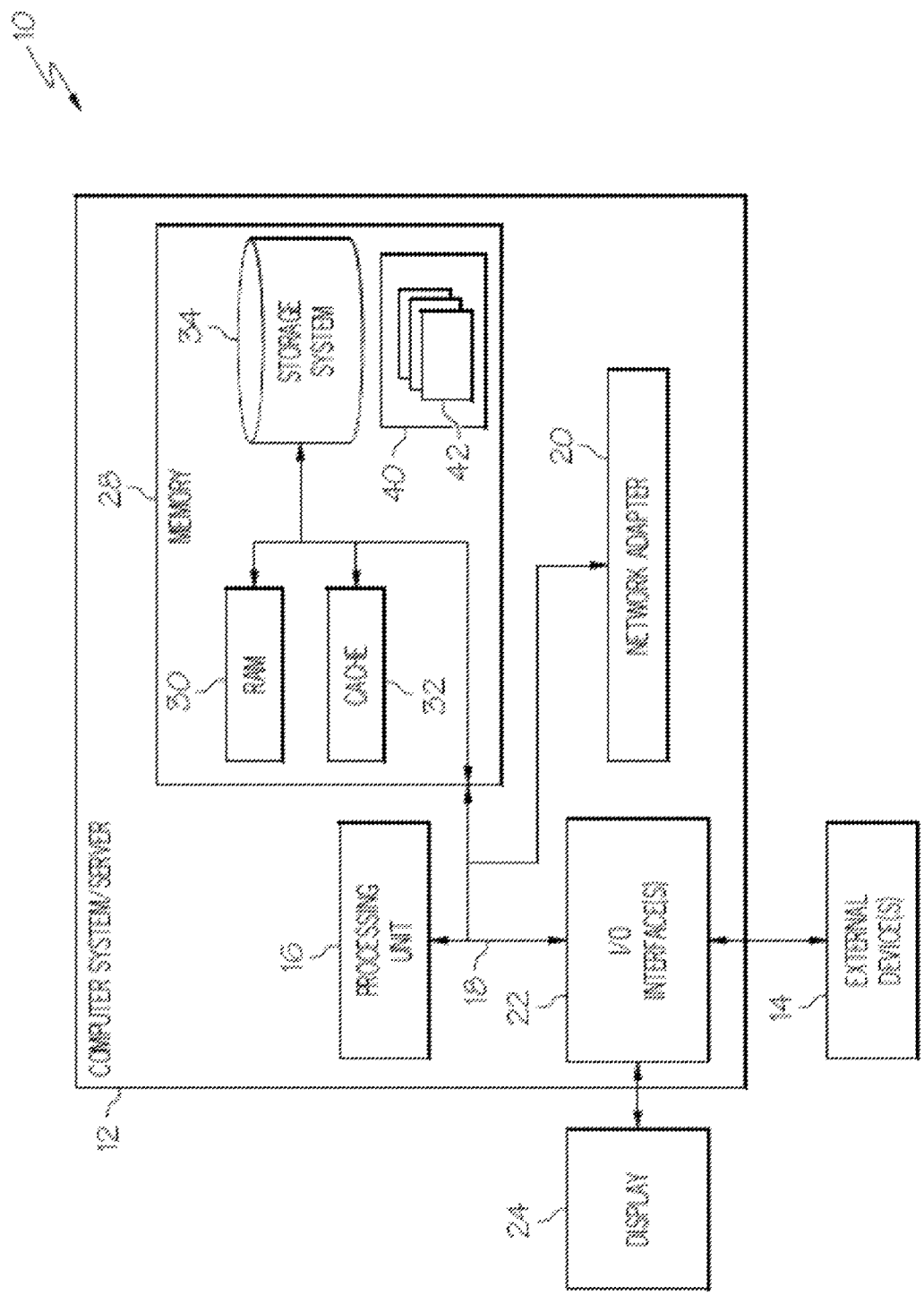
FIG. 1 depicts a cloud computing node according to an embodiment.

Embodiments disclosed herein allow a workload flow to increase at a controlled rate while preventing instability on converged Ethernet links, the instability being caused by a race condition between a priority flow control (PFC) protocol and a quantized congestion notification (QCN) protocol. Embodiments provide an adaptive equalization operation for dynamically determining an equilibrium set point for a QCN protocol. Embodiments couple the PFC protocol to the QCN protocol so that the QCN protocol is able to monitor the operation of the PFC protocol and adjust the equilibrium set point value to ensure that the QCN protocol will always activate prior to the PFC protocol.

In a contemporary Ethernet fabric, the PFC protocol and the QCN protocol operate independently from one another. Accordingly, the PFC and QCN protocols may compete with one another and get stuck in a race condition. As the network gets congested, sometimes QCN kicks in first and sometimes PFC kicks in first. Further, when both protocols are near their threshold, one protocol may kick in and runs for a while, then shut off to allow the other protocol to kick in. This causes a race condition of which protocol is going to take over first and creates instability in the network due to link flapping. This is especially a problem if the data patterns going through the network are random and unpredictable. Network performance may suffer and, in the worst case, a catastrophic collapse of the network may occur due to unsteady packet flow, which shuts the link down.

Accordingly, embodiments couple the PFC and QCN protocols to provide an adaptive equalization operation for dynamically determining an equilibrium set point for a QCN protocol and ensure that the QCN (stable, yet slower e2e) protocol will always have the chance to activate prior to the PFC (faster, yet prone to oscillations link-level) protocol.

It is understood in advance that although this invention includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of a cloud computing node for adaptively determining the equilibrium set point for a QCN protocol of an embodiment is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device, also referred to as a processing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 may include a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
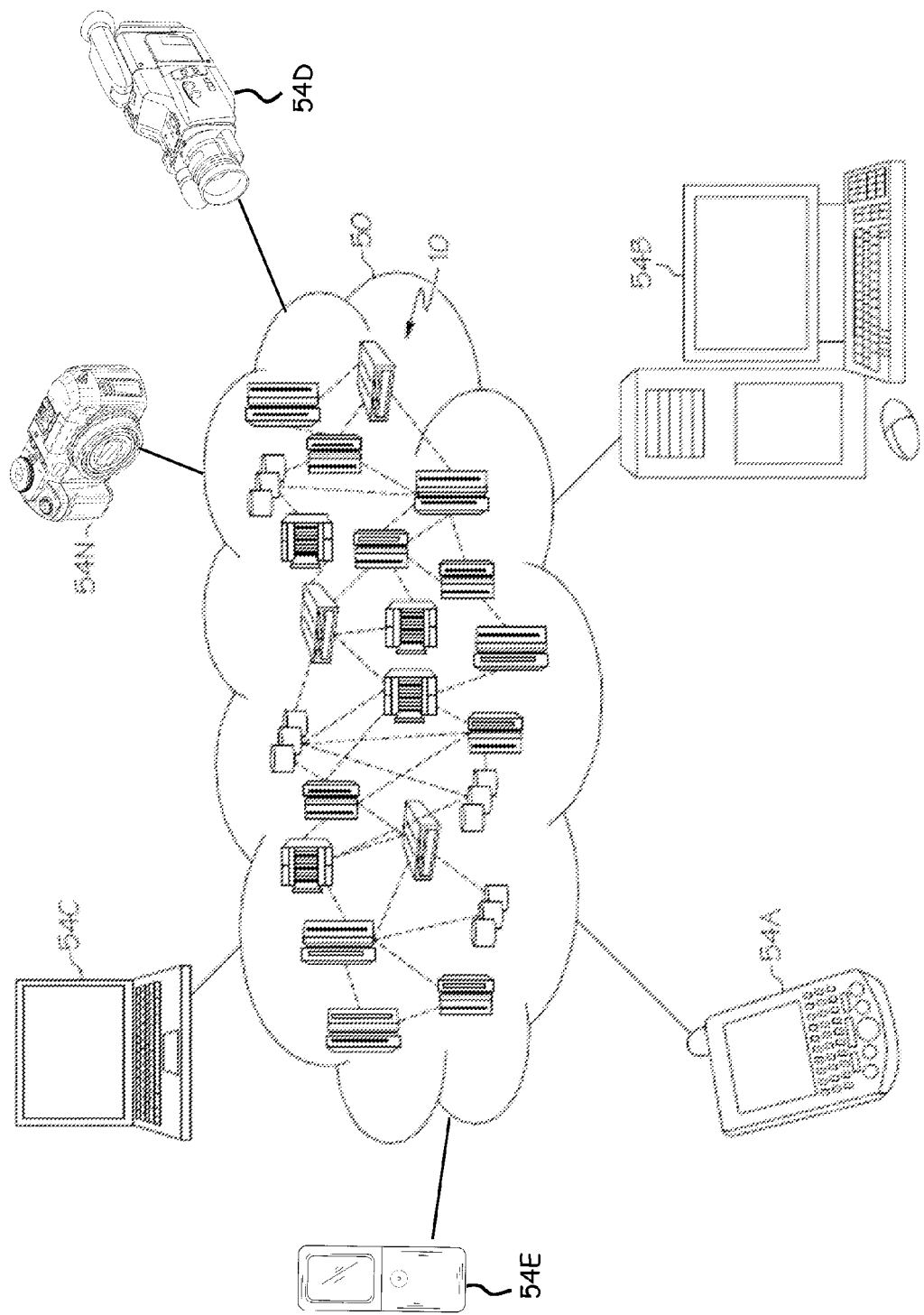
FIG. 2 depicts a cloud computing environment according to an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, digital video camera 54D, digital audio recording device 54E, and/or digital still camera 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
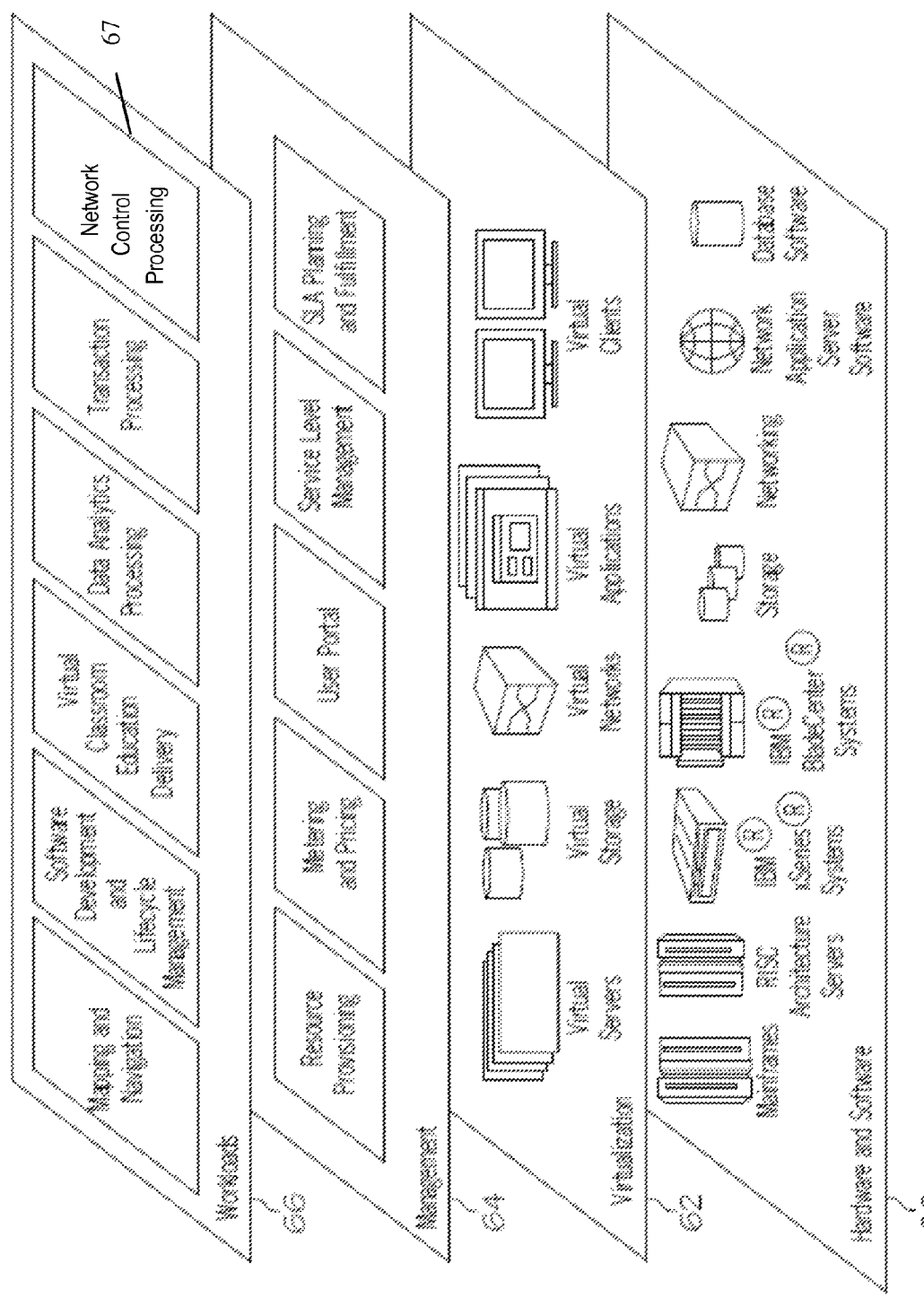
FIG. 3 depicts abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and network control processing 67.

Figure 4:
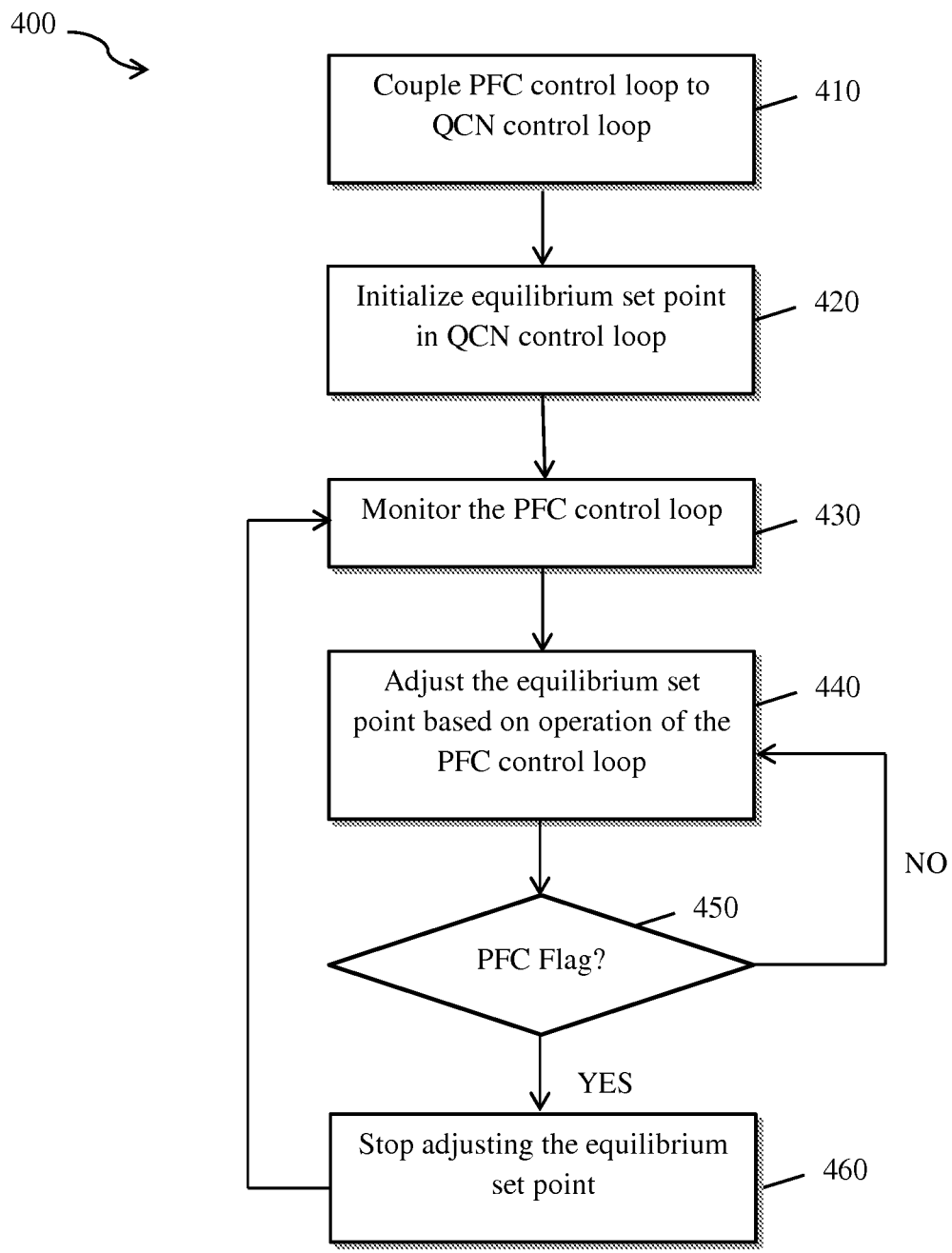
FIG. 4 depicts a flow diagram of an adaptive equalization process for dynamically determining an equilibrium set point for a quantized congestion notification protocol according to an embodiment.

Turning now to FIG. 4, an adaptive equalization process 400 for tuning the QCN control loop based on tracking the PFC loop is performed by the network congestion processing module 67 is generally shown. As shown in FIG. 4, the adaptive equalization process 400 dynamically determines an equilibrium set point for a QCN protocol. An embodiment adaptively determines the equilibrium set point for a QCN protocol to maximize the link utilization, increase stability and prevent a race condition between a PFC protocol and a QCN protocol on converged Ethernet links.

At block 410, an embodiment couples the PFC protocol to the QCN protocol. By coupling the PFC protocol to the QCN protocol, the QCN protocol is able to monitor the operation of the PFC protocol. An embodiment may be implemented using coupled control feedback loops. For example, a first control loop (PFC) may be coupled to a second control loop (QCN) whereby the second control loop monitors the operation of the first control loop.

At block 420, an embodiment sets a low equilibrium set point (Qeq) value for the QCN protocol. The Qeq is the target level around which a queue length should oscillate under normal congestion conditions. According to an embodiment, the Qeq threshold is set at a lower value than contemporary systems and QCN standard Qeq recommendations of ca. 20% of Qmax to ensure that the QCN protocol will always be activated prior to the PFC protocol. For example, the Qeq may be initially set to a low value to trigger the QCN to transmit a congestion notification message when a queue reaches a range anywhere from approximately 0.5-50% capacity. In contrast, contemporary systems set the Qeq value statically at 17-25% based on the size of the queue Qmax. Accordingly, in contemporary systems, the QCN will generally wait until the queue feedback exceeds a fixed value calculated based on the static Qeq before sending a congestion notification message (CNM).

By dynamically lowering the Qeq value, an embodiment improves the overall utilization and prevents a race condition between the PFC protocol and the QCN protocol on converged Ethernet links by triggering the QCN protocol before the PFC protocol. According to an embodiment, the Qeq is initialized for the second control loop (QCN) prior to beginning operation of the first control loop (PFC). Because the queues of the switches in the network can absorb more packets before needing to throttle a source data rate, it would be inefficient to leave the Qeq at the low value shown in block 420.

Accordingly, at block 430, the second control loop (QCN) monitors the operation of the first control loop (PFC). Based on the monitoring of the first control loop (PFC), an embodiment dynamically adjusts the Qeq in the second control loop (QCN) continuously based on the rate at which the first control loop (PFC) operates thereby allowing a workload flow to increase at a controlled rate, as shown in block 440. The dynamic adjustment of the Qeq value may be implemented by a third control loop according to an embodiment. The low value of Qeq, which was initially set in block 420, is slowly increased based on the monitoring of the first control loop (PFC) according to a Qeq control algorithm. The Qeq control algorithm of an embodiment slowly increases the Qeq value until the point that the PFC protocol is triggered, thus causing On/Off oscillations typical of such link-level flow control loops.

In block 450, when a flag indicating that the PFC protocol is about to the triggered is encountered, the control algorithm stops increasing the Qeq value, as shown in block 460, and returns to monitoring the activity of the first loop (PFC), as shown in block 430. In other words, an embodiment dynamically determines the point where PFC protocol is triggered and runs the QCN protocol a little below that so that the QCN protocol will always have the chance to be triggered prior to the PFC protocol.

If, however, the flag indicating that the PFC protocol is about to the triggered is not encountered, the control algorithm will continue to dynamically adjust the Qeq in the second control loop (QCN) based on the rate at which the first control loop (PFC) operates thereby allowing a workload flow to increase at a controlled rate, as shown in block 440.

According to an embodiment, the Qeq is continuously adapted to be a slow follower (with a fixed or variable lag) based on the PFC protocol activity. For example, if a couple of extra switches are added to the network and/or the PFC triggering values changes, the Qeq control algorithm of an embodiment automatically increases the Qeq value to compensate for the PFC value changes due to the added switches in the network. Each control loop of an embodiment has certain parameters associated therewith, which may be utilized and manipulated by one of ordinary skill in the art to optimize network efficiency, such as the delay time in the feedback loop, the threshold level, the stability conditions, and the like The control algorithm of an embodiment may be run locally on each switch of the network as well as remotely on a central controller. According to an embodiment, the control algorithm may be implemented using software-defined networking (SDN) approach (e.g., OpenFlow) that separates the central controller that makes decisions about where traffic is sent, the control plane, from the underlying switches that forward traffic to the selected destination, the data plane. This architecture allows network administrators to have programmable central control of network traffic without requiring physical access to the network's hardware devices.

Technical effects and benefits of embodiments include allowing a workload flow to increase at a controlled rate while preventing instability on converged Ethernet links caused by a race condition between a PFC protocol and a QCN protocol.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for controlling workload flow on converged Ethernet links, comprising:
   coupling, by a processing device, a first control loop that runs a link level flow control protocol for a link to a second control loop that runs an end-to-end congestion notification protocol for the link, the second control loop monitoring the operation of the first control loop;
   initializing an equilibrium set point value for the second control loop prior to commencing operation of the first control loop, the equilibrium set point value indicating a target congestion level for the link and utilized by the second control loop to generate a congestion notification message, the equilibrium set point value selected by the initializing to cause the congestion notification message to be generated prior to the first control loop being triggered; and
   adjusting the equilibrium set point value in the second control loop continuously based on a rate of operation of the first control loop, the adjusted equilibrium set point value selected to cause a next congestion notification message to be generated prior to a next triggering of the first control loop.

2. The computer-implemented method of claim 1, wherein the first control loop runs a priority flow control protocol.

3. The computer-implemented method of claim 1, wherein the second control loop runs a quantized congestion notification protocol.

4. The computer-implemented method of claim 1, wherein the low equilibrium set point value is initialized to trigger the transmission of a congestion notification message when a queue in the network reaches a predetermined capacity.

5. The computer-implemented method of claim 1, wherein the adjusting of the equilibrium set point value in the second control loop further comprises dynamically increasing the equilibrium set point value based on the monitoring of the operation of the first control loop.

6. The computer-implemented method of claim 5, wherein, responsive to encountering a flag indicating a triggering of the first control loop, pausing the increase of the equilibrium set point value.

7. A computer program product for controlling workload flow on converged Ethernet links, the computer program product comprising:
   a computer readable storage medium having program code embodied therewith, the program code executable by a processing device for:
   coupling, by a processing device, a first control loop that runs a link level flow control protocol for a link to a second control loop that runs an end-to-end congestion notification protocol for the link, the second control loop monitoring the operation of the first control loop;
   initializing an equilibrium set point value for the second control loop prior to commencing operation of the first control loop, the equilibrium set point value indicating a target congestion level for the link and utilized by the second control loop to generate a congestion notification message, the equilibrium set point value selected by the initializing to cause the congestion notification message to be generated prior to the first control loop being triggered; and
   adjusting the equilibrium set point value in the second control loop continuously based on a rate of operation of the first control loop, the adjusted equilibrium set point value selected to cause a next congestion notification message to be generated prior to a next triggering of the first control loop.

8. The computer program product of claim 7, wherein the first control loop runs a priority flow control protocol.

9. The computer program product of claim 7, wherein the second control loop runs a quantized congestion notification protocol.

10. The computer program product of claim 7, wherein the low equilibrium set point value is initialized to trigger the transmission of a congestion notification message when a queue of a switch in the network reaches a predetermined capacity.

11. The computer program product of claim 7, wherein the adjusting of the equilibrium set point value in the second control loop further comprises dynamically increasing the equilibrium set point value based on the monitoring of the operation of the first control loop.

12. The computer program product of claim 11, wherein, responsive to encountering a flag indicating a triggering of the first control loop, pausing the increase of the equilibrium set point value.

* * * * *